April 18, 1950      M. G. PRIETO      2,504,349
WATER PURIFICATION APPARATUS

Filed March 30, 1945      4 Sheets-Sheet 1

INVENTOR:
MIGUEL G. PRIETO
BY
Mellin, Aurich & Hanscom
ATTORNEYS

April 18, 1950  M. G. PRIETO  2,504,349
WATER PURIFICATION APPARATUS
Filed March 30, 1945  4 Sheets-Sheet 2

INVENTOR.
MIGUEL G. PRIETO
BY
Mellin, Aurich & Hanscom
ATTORNEYS

April 18, 1950 M. G. PRIETO 2,504,349
WATER PURIFICATION APPARATUS

Filed March 30, 1945 4 Sheets-Sheet 3

INVENTOR.
MIGUEL G. PRIETO
BY
Mellin, Aurich & Hanscom
ATTORNEYS

April 18, 1950     M. G. PRIETO     2,504,349
WATER PURIFICATION APPARATUS

Filed March 30, 1945     4 Sheets-Sheet 4

INVENTOR.
MIGUEL G. PRIETO
BY
Mellin, Aurich & Hanscom
ATTORNEYS

Patented Apr. 18, 1950

2,504,349

UNITED STATES PATENT OFFICE 2,504,349

WATER PURIFICATION APPARATUS

Miguel G. Prieto, Chicago, Ill.

Application March 30, 1945, Serial No. 585,740

8 Claims. (Cl. 21—102)

1

This invention relates to devices for the purification of water and particularly pertains to an apparatus for such purpose utilizing ultraviolet ray lamps for disposing of bacteria in drinking water.

It is the principal object of my present invention to provide an improved apparatus for purification of drinking water, in which apparatus the purification is effected by subjecting water passing therethrough to the germicidal effects of ultraviolet rays.

It is a further object of my present invention to provide a device of the character referred to which is of simple, compact and inexpensive construction and in which access to the various parts can be readily had for cleansing purposes.

The invention is exemplified in the following description and illustrated by way of example in the accompanying drawings, in which.

Figure 1:
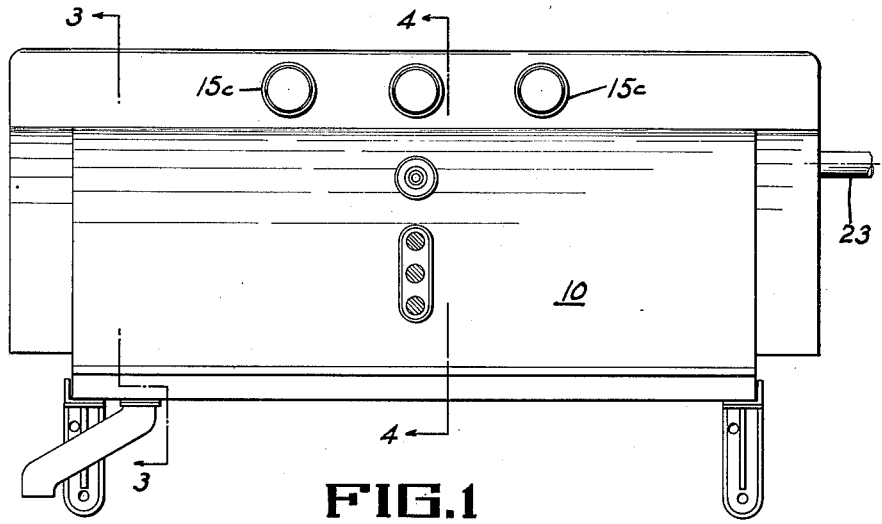
Fig. 1 is a view in elevation of a device embodying one form of my invention.
Figure 2:
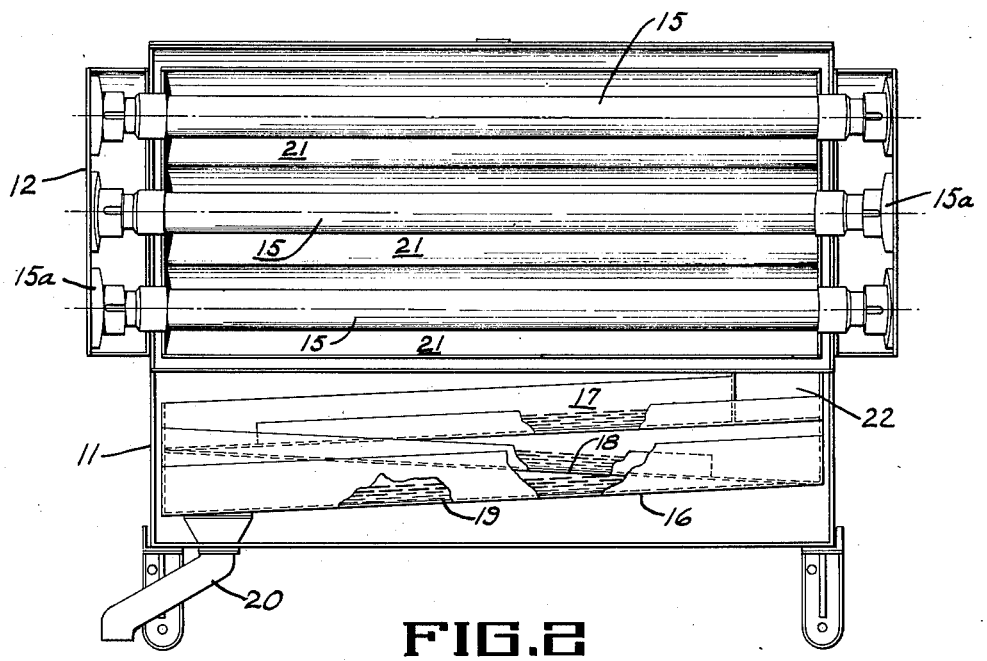
Fig. 2 is a front elevation of the same with the cover portion in elevated or open position.
Figure 3:
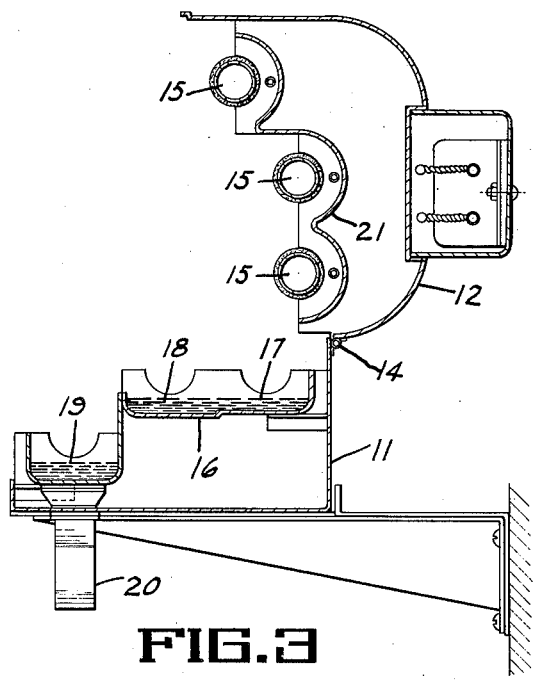
Fig. 3 is a transverse sectional view of the apparatus taken on line 3—3 of Fig. 2.

Referring more particularly to the accompanying drawings, in the form of the device illustrated in Figs. 1 to 5, inclusive, 10 indicates a water purification device embodying the preferred form of my invention. This apparatus comprises a housing divided into a base portion 11 and a cover portion 12 articuately connected by a hinge 14. This hinge connection enables the cover portion to be upraised as illustrated in Fig. 3. When the cover portion 12 is in lowered or closed position, the base and cover portions 11 and 12 of the housing form a complete encasement for the interior mechanism of the apparatus. To accomplish this the front and end walls

2 of the base section 11 and the cover section 12 are complemental, as illustrated.

When the cover section 12 is in upraised or open position, as illustrated in Fig. 3, access may be had to the germicidal lamps 15 carried by the cover section 12 and to a water tray 16 carried by the base section 11. The water tray 16 is rigidly fastened within the base section 11 and is so constructed that water delivered thereto for purification will travel by gravity in a tortuous path thereover from the inlet to the discharge.

For this purpose the water tray 16 is formed of three integral shallow troughs 17, 18 and 19, which are disposed in side by side position and extend in parallelism longitudinally of the housing. The troughs 17 and 19 are similarly inclined but at different elevations, while the trough 18 is oppositely inclined to the same degree and its upper end is on the level with the lower end of the trough 17. Its lower end is on approximately the level of the upper end of the trough 19. The trough 18 communicates at its upper end with the lower end of the trough 17 and communicates at its lower end with the upper end of the trough 19, as illustrated, so that water delivered to the upper end of the trough 17 will travel longitudinally thereover, thence laterally into the upper end of the trough 18 and reverse its longitudinal travel so as to pass over the trough 18 and deposit in the upper end of the trough 19. At this point it discharges laterally into the upper end of the trough 19 and again reverses its travel and travels longitudinally of the trough 19 to a discharge spout 20, which opens into the trough 19 adjacent the lowermost end thereof. Thus, it is seen that water delivered into the tray 16 will travel in a tortuous path thereover by gravity in a comparatively shallow sheet from the point of inlet to the point of discharge.

Figure 4:
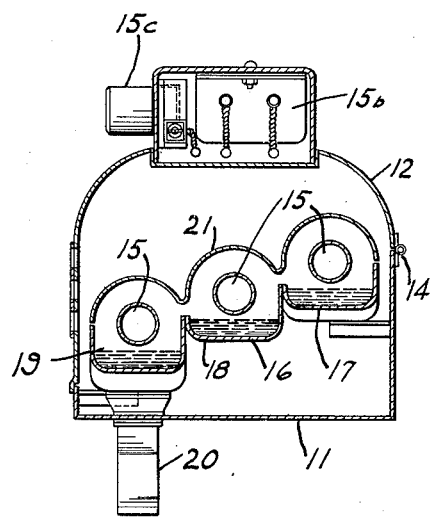
Fig. 4 is a transverse sectional view through the apparatus taken on line 4—4 of Fig. 1.
Figure 5:
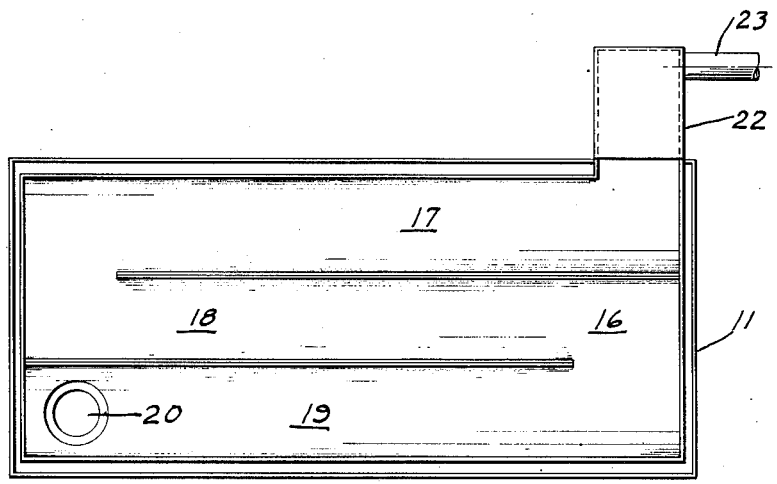
Fig. 5 is a plan view of the tray over which the water passes in a tortuous path.
Figure 6:
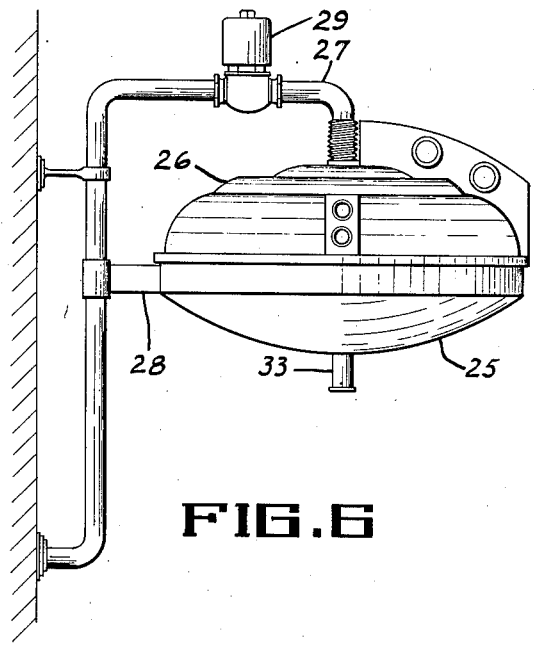
Fig. 6 is a side elevation of a second form which the invention may assume.

Mounted in the cover section 12 of the housing are the three germicidal lamps 15, one being provided for each trough 17 to 19, inclusive. These lamps are so mounted in the cover section 12 of the housing that one centrally overlies and extends longitudinally the full length of each trough. These lamps are mounted in the cover section 12 so that when the cover section 12 is in closed position, as illustrated in Fig. 4, each lamp is disposed parallel to the bottom of its particular trough at a properly spaced distance from that bottom so as to overlie water travelling therealong. In other words, one of the lamps is arranged longitudinally of the housing in parallelism with the bottom of the trough 17. The next lamp 15 is mounted in the cover 12 to extend in parallelism with the bottom of the trough 18, while the third lamp centrally overlies the trough 19 and is disposed in parallelism with the bottom thereof. This is so that the water will be exposed to the purifying bacteria killing effects of the lamps equally during its entire tortuous travel over the tray 16.

It should be pointed out here that the tray 16 and the troughs formed thereby are made of suitable material having a high reflecting and low absorption factor so as to maintain a continuous repulsion of the ultraviolet rays bombarded by the lamps and assuring a continuous crisscross of the violet rays through the body of the water while the latter is in motion over the troughs.

It is intended, as previously pointed out, to provide a water flow over the troughs evenly spread over the bottom thereof and of a substantially uniform depth in order that the ultraviolet energy radiated from the lamps will be effective in reaching throughout the entire water depth and thereby be effective in killing all bacteria therein. The tortuous path which the water takes through the present apparatus and the slope of the troughs is such that sufficient time elapses between the delivery of the water to the troughs and its discharge therefrom to enable the ultraviolet energy radiated from the lamps to be completely effective in disposing of all of the bacteria therein.

For increasing the effectiveness of the lamps, I provide each of them with a semi-circular reflector 21. These reflectors are interconnected and are rigidly secured to the cover section 12 of the housing and are disposed in correct reflecting position with respect to each lamp. They are likewise formed of a suitable material with a high reflecting and low absorption factor so as to properly reflect the energy rays radiated from the lamps into the stream of water flowing through the troughs. These reflectors are, of course, fixed in the cover section 12 in parallelism with the lamps 15, all as illustrated.

Obviously, when the cover 12 is upraised, as shown in Fig. 3, the lamps may be removed and the reflectors quickly cleansed. Although the shape of the reflectors shown in the drawings is substantially semi-circular in cross-section and concentric with respect to the lamps 15, they may be parabolic or any other desired form or shape which may produce a maximum reflection without departing from my invention.

The lamp sockets 15a for the lamps are suitably mounted in the ends of the cover section and are suitably electrically associated with ballasts 15b and lamp starters 15c. Inasmuch as the association between the lamps and these electric elements is old and well known, the circuits thereof need not be described in detail.

At one end of the housing and carried by the base section 11 thereof is a water supply box 22 connected with a source of inlet water by a pipe 23 which may be controlled by any suitable form of valve. This water supply box is so constructed and so associated with the upper end of the trough 17, as illustrated, that the water, when it flows into said trough, is spread in a wide flat stream.

In the use of the apparatus it is constructed and assembled as shown in the drawings and water is delivered to the water supply box 22 from whence it discharges in a flat stream into the upper end of the trough 17 of the tray 16. From this point it flows in a stream of even depth downwardly of the trough 17 and then laterally into the trough 18, and then downwardly of that trough and thence laterally into the upper end of the trough 19. From this point it flows downwardly to and thence through the discharge spout 20. The angularity or slope of the troughs 17 to 19, inclusive, is such that the water will flow in a stream of substantial uniform depth with a minimum of turbulence throughout its tortuous travel over the tray 16. During this time the circuit through the germicidal lamps is completed so that the latter will radiate ultraviolet energy, which energy rays will bombard the water as it travels through its tortuous path to dispose of the bacteria therein.

For the purposes of replacing the germicidal lamps or cleaning the unit for any reason whatsoever, it is merely necessary to elevate the cover section 12 which completely exposes the entire interior of the housing and all parts thereof so that the same may be cleansed or replaced if necessary.

If desired, the apparatus may be disposed on a stand of any character or it may be disposed on wall support brackets, as disclosed in the drawings.

In the form of the invention disclosed in Figs. 6 to 10, inclusive, the housing is generally cylindrical in plan and is composed of a base portion 25 and a complemental cover portion 26. The cover portion is suspended on a pipe 27 which is bent right angularly, as illustrated, and constitutes not only a water conduit to the cover, but also constitutes a bracket for suspending the apparatus from a wall or other upright support as illustrated.

Figure 8:
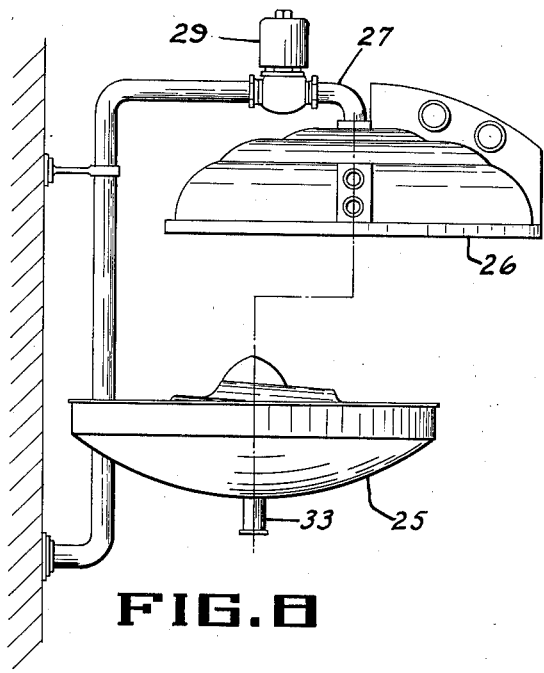
Fig. 8 is a view like Fig. 6 with the exception that the cover and base portions are separated to show the manner in which they may be cleansed.
Figure 9:
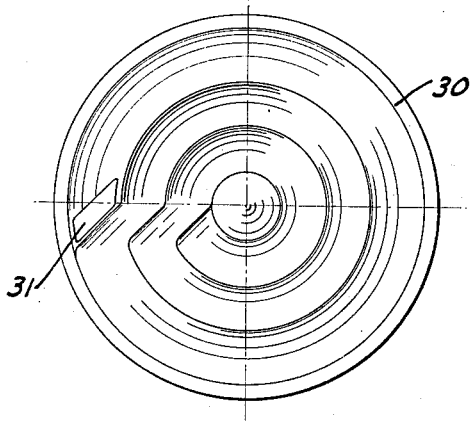
Fig. 9 is a plan view of the trough plate.
Figure 10:
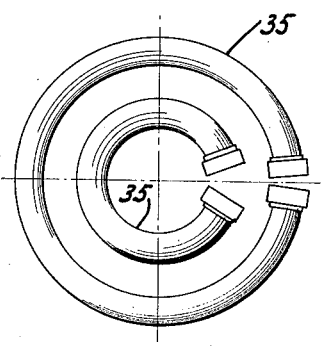
Fig. 10 is a diagrammatic view showing the arrangement of the germicidal lamps which are disposed overlying the trough plate.

The base portion 25 of the apparatus is connected by a connector 28 to the vertical portion of the pipe 27 in a manner that enables it to be moved vertically coaxially of the cover and pivoted about the pipe 27 in a horizontal plane, as most clearly illustrated in Fig. 8. By lowering the base portion 25 with respect to the cover, the interior of the apparatus will be entirely accessible for cleansing or any other purpose.

It will be noticed that the marginal meeting edges of the cover and base portions 26 and 25 are complemental to form a comparatively tight water seal therebetween when the two parts are brought in juxtaposition for use.

Figure 7:
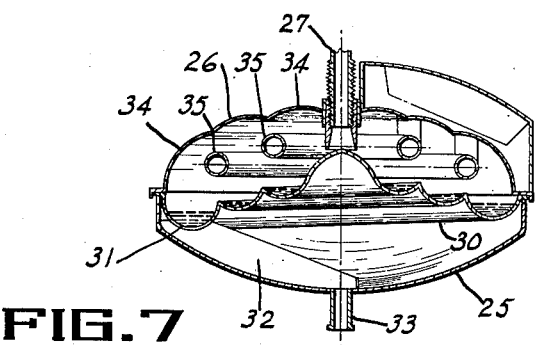
Fig. 7 is a central vertical scection therethrough.

The connection between the pipe 27 and the cover 26 is most clearly illustrated in Fig. 7, in which it is shown that the end of the pipe 27 is fixed at the axial center of the cover and projects downwardly therethrough. This is in order that water to be treated may be admitted from the pipe 27 directly through the cover and discharged downwardly over the axial center of the base portion 25. A valve 29 is provided, as in the form previously discussed, to control the amount of water admitted to the apparatus.

Fixed within the base portion 25 is a circular trough plate 30 which is so formed as to provide a shallow spiral and gradually declining shallow trough from its axial center to its perimeter, thus providing a gradually declining spiral or tortuous water conducting passageway from its axial center to its perimeter. This is most clearly illustrated in Fig. 9 of the drawings.

The formation of the passageway or trough in the trough plate is such that water deposited over the axial center of the plate will discharge into the upper end of the spiral trough or passageway and the same will travel by gravity throughout the length of the spiral passageway in a shallow stream and discharge at the perimeter of the plate. For this purpose the trough plate is formed with a port 31 connected to a conduit 32 within the base portion 25, and which in turn is connected with a spout 33 at the bottom of the base portion for the discharge of the water.

The underside of the cover member 26 is formed to provide concentric reflectors 34 for directing rays of germicidal lamps which are arcuate in cross-section. These reflectors are formed of suitable material with a high reflecting and low absorption factor so as to properly reflect the energy rays radiated from lamps into the stream of water flowing over the trough or spiral passageway.

Suspended at a spaced distance from the reflectors so that they will be spaced likewise from the troughs are two substantially circular germicidal lamps 35. One of these lamps is of a diameter smaller than the other and they are concentrically disposed within the cover portion 26 in such a fashion that their energy rays will be directed through the water passing over the spiral passageway. The position of the lamps is such that they are substantially parallel to the bottom of the passageway or trough and substantially overlying the same, so that the water will be subjected to the energy rays of the lamps throughout its entire passage over the trough plate.

The cover portion 26 carries suitable electrical connections for directing the activating current to the lamp. As the details of such connections are conventional, they are not here illustrated or described.

I should like to point out, however, that the trough plate is made of suitable material having a high reflecting and low absorption factor so as to maintain a continuous repulsion of the ultraviolet rays bombarded by the lamps and assuring a continuous crisscross of the violet rays through the body of the water, while the latter is in motion over the trough plate.

When it is desired to cleanse the apparatus shown in Figs. 6 to 10, inclusive, it is only necessary to close the valve 29, lower the base portion 25 on the pipe 27 and then swing the base portion horizontally out of alignment with the cover portion 26. This renders all parts of the apparatus accessible for cleansing. Likewise, it renders the lamps accessible for replacement.

From the foregoing it is obvious that I have provided a very simple and efficient apparatus of comparatively small size which may be used in purification of drinking water as it is used or in comparatively small amounts. Obviously, the apparatus which I have disclosed herein will be comparatively inexpensive to produce while adapted for efficient home use.

While I have shown the preferred forms of my invention, it is to be understood that various changes may be made in its construction by those skilled in the art without departing from the spirit of the invention as defined in the appended claims.

Having thus described my invention, what I claim and desire to secure by Letters Patent is:

1. An apparatus of the character described comprising a casing, a tray in the casing, said tray comprising interconnected shallow troughs for conducting a comparatively flat shallow stream of water over the tray by gravity in a tortuous path, and a plurality of germicidal lamps overlying the tray and in parallelism with said troughs to radiate their rays through such a stream as it passes over said troughs.

2. An apparatus of the character described comprising a casing formed of a base section and a cover section, a tray substantially horizontally disposed in the base section and formed with inclined interconnected troughs forming a continuous tortuous declining path over the tray, germicidal lamps carried in said cover section to overlie the troughs when said cover section is in lowered or closed position with respect to the base to radiate their rays through a stream of water flowing by gravity over the tortuous declining path formed by said troughs.

3. An apparatus of the character described comprising a casing formed of a base section and a cover section hingedly connected thereto, a tray disposed substantially horizontally in the base section and formed with longitudinally interconnected troughs so inclined as to form a continuous tortuous declining water conducting passageway on the tray, elongated germicidal lamps carried by the cover section and overlying the troughs when said cover section is closed and extending substantially centrally and longitudinally thereof in parallelism with the bottoms of the troughs at a uniform distance therefrom whereby said lamps will radiate their rays through a stream of water being conducted over said troughs.

4. An apparatus of the character described comprising a casing formed of a base section and a cover section hingedly connected thereto, a tray disposed substantially horizontally in the base section and formed with longitudinally interconnected troughs so inclined as to form a continuous tortuous declining water conducting passageway on the tray, elongated germicidal lamps carried by the cover section and overlying the troughs when said cover section is closed and extending substantially centrally and longitudinally thereof in parallelism with the bottoms of the troughs at a uniform distance therefrom whereby said lamps will radiate their rays through a stream of water being conducted over said troughs, and means for delivering water to the most elevated end of said path and discharging it from the lowermost end of said path formed by the troughs.

5. Apparatus of the character described, comprising a casing formed of a bottom section and a removable cover section, a trough disposed in said bottom section and defining a path having an inclined surface for conducting a comparatively shallow stream of liquid through said casing by gravity, liquid inlet and outlet means for said trough, and lamp means adapted to produce germicidal radiation, said lamp means having a configuration generally similar to said trough and overlying the same when said cover section is closed and being positioned in spaced, substantially parallel relation to said trough substantially throughout the full extent thereof.

6. Apparatus of the character described comprising a bottom section, a trough disposed therein defining a declining path for conducting a comparatively flat shallow stream of liquid through the apparatus by gravity, a cover section and germicidal lamp means disposed within said cover section, said lamp means having the same general configuration as said trough and positioned to overlie said trough in spaced relation thereto and in substantially parallel relationship therewith substantially throughout said trough for radiating germicidal rays through the stream as it passes through the apparatus.

7. Apparatus of the character described, comprising a bottom section, a conico-helical trough disposed therein defining an inwardly and downwardly spiraling path for water, a cover section, and lamp means disposed in said cover section, said lamp means having a substantially conico-helical configuration overlying said trough in spaced relation thereto and in substantially parallel relation therewith substantially throughout the path.

8. A purifying apparatus comprising a casing, shallow trough means in the casing comprising an inclined surface for conducting a comparatively flat shallow stream of liquid through said casing by gravity, and germicidal lamp means overlying and substantially parallel to said surface, and extending substantially throughout the full extent of said surface along the line of flow to radiate germicidal rays through said stream as it passes over said surface.

MIGUEL G. PRIETO.

REFERENCES CITED

The following references are of record in the file of this patent:

UNITED STATES PATENTS

| Number | Name | Date |
|---|---|---|
| 1,052,818 | Henri et al. | Feb. 11, 1913 |
| 1,193,143 | Henri et al. | Aug. 1, 1916 |
| 1,582,677 | Goodall | Apr. 27, 1926 |
| 2,248,618 | Fischer | July 8, 1941 |
| 2,332,099 | McKinnis | Oct. 19, 1943 |
| 2,347,954 | Kiely | May 2, 1944 |

FOREIGN PATENTS

| Number | Country | Date |
|---|---|---|
| 486,754 | Great Britain | June 7, 1938 |

OTHER REFERENCES

"Food Industries," June 1936, article by James, pp. 295-297.